US011959556B2

(12) United States Patent
Gretka, II

(10) Patent No.: US 11,959,556 B2
(45) Date of Patent: Apr. 16, 2024

(54) PRESSURE RELIEF VALVE ASSEMBLY

(71) Applicant: Dadco, Inc., Plymouth, MI (US)

(72) Inventor: David John Gretka, II, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 0 days.

(21) Appl. No.: 17/043,903

(22) PCT Filed: Apr. 11, 2019

(86) PCT No.: PCT/US2019/026897
§ 371 (c)(1),
(2) Date: Sep. 30, 2020

(87) PCT Pub. No.: WO2019/200039
PCT Pub. Date: Oct. 17, 2019

(65) Prior Publication Data
US 2021/0018106 A1  Jan. 21, 2021

Related U.S. Application Data

(60) Provisional application No. 62/656,548, filed on Apr. 12, 2018.

(51) Int. Cl.
*F16K 15/18* (2006.01)
(52) U.S. Cl.
CPC .................... *F16K 15/18* (2013.01)
(58) Field of Classification Search
CPC ........... F16K 15/18; F16K 1/303; F16K 1/306
USPC ................................................ 251/128, 291
See application file for complete search history.

(56) References Cited

U.S. PATENT DOCUMENTS

| RE23,487 | E | * | 4/1952 | McCabe | ................ | F16K 1/307 |
|---|---|---|---|---|---|---|
| | | | | | | 62/50.7 |
| 2,845,083 | A | * | 7/1958 | Graybill | .................. | F16K 15/18 |
| | | | | | | 137/329.2 |
| 2,868,224 | A | * | 1/1959 | Helge | ..................... | F16K 1/303 |
| | | | | | | 137/495 |

(Continued)

FOREIGN PATENT DOCUMENTS

| CN | 202629196 U | 12/2012 |
|---|---|---|
| CN | 105909840 A | 8/2016 |

(Continued)

OTHER PUBLICATIONS

PCT/US2019/026897 International Search Report and Written Opinion dated Aug. 12, 2019 (dated Aug. 12, 2019).

(Continued)

*Primary Examiner* — Kenneth Rinehart
*Assistant Examiner* — Nicole Gardner
(74) *Attorney, Agent, or Firm* — Reising Ethington P.C.

(57) ABSTRACT

A gas pressure relief valve assembly with a normally closed check valve received in a main body. An actuator pin slidably received in a guide body threadably carried by the main body may be advanced to open the check valve and retracted to permit the check valve to close. A knob connected to the actuator pin and threadably carried by the guide body may be manually rotated in opposite directions to advance and retract the actuator pin. Rotary loosening of the threaded knob and/or loosening of the threaded guide body will retract the actuator pin and prevent opening of the check valve.

18 Claims, 3 Drawing Sheets

(56) References Cited

U.S. PATENT DOCUMENTS

| | | | |
|---|---|---|---|
| 2,952,247 A | 9/1960 | Swanson | |
| 3,645,496 A * | 2/1972 | Rawlins | F25B 45/00 |
| | | | 251/148 |
| 4,838,527 A * | 6/1989 | Holley | F16F 9/3264 |
| | | | 137/596 |
| 4,905,730 A | 3/1990 | Stoll | |
| 6,273,397 B1 * | 8/2001 | Schultz | F25B 41/40 |
| | | | 251/149.6 |
| 9,371,926 B2 | 6/2016 | Martin | |
| 2004/0187921 A1 | 9/2004 | Kremer et al. | |
| 2005/0145809 A1 | 7/2005 | Lee | |
| 2008/0061259 A1 | 3/2008 | Reginaldo | |
| 2014/0048169 A1 | 2/2014 | Pisot et al. | |
| 2014/0369874 A1 | 12/2014 | Hines et al. | |

FOREIGN PATENT DOCUMENTS

| | | |
|---|---|---|
| DE | 7219024 U | 9/1972 |
| EP | 2572126 A1 | 3/2013 |
| EP | 2699837 A1 | 2/2014 |
| EP | 2754915 A2 | 7/2014 |
| JP | S32008260 Y | 7/1957 |
| JP | S35006072 Y | 4/1960 |
| JP | S37018661 Y | 7/1962 |
| JP | S57046162 U | 8/1980 |
| JP | S5853967 U | 4/1983 |
| JP | S58142464 U | 9/1983 |
| JP | S63280939 A | 11/1988 |
| JP | H05215299 A | 8/1993 |
| JP | 2009503397 A | 1/2009 |
| TW | 201411016 A | 3/2014 |

OTHER PUBLICATIONS

European Search Report for Application No. EP19784693 dated May 3, 2021 (9 pages).

European Office Action corresponding to European Application 19784693.4; dated Apr. 20, 2022; 6 pages.

Taiwan Office Action and Search Report corresponding to Taiwan Application Serial No. 108112480, dated Mar. 21, 2022, 8 pages.

Chinese Office Action corresponding to Chinese Application 201980038957.6; dated Mar. 2, 2022; 15 pages.

Chinese Search Report corresponding to Chinese Application 201980038957.6; dated Feb. 24, 2022; 3 pages.

Chinese Office Action with English language summary, corresponding to Chinese Application 201980038957.6; dated Apr. 7, 2023; 17 pages.

Chinese Office Action with English language summary, corresponding to Chinese Application 201980038957.6; dated Nov. 25, 2022; 11 pages.

Japanese Office Action with English language summary, corresponding to Japanese Application 2020-555385; dated Dec. 13, 2022; 14 pages.

* cited by examiner

PRESSURE RELIEF VALVE ASSEMBLY

TECHNICAL FIELD

This invention relates generally to the controlled release of pressurized gas and more particularly to a pressure relief valve assembly.

BACKGROUND

Pressure relief valve assemblies have been used with control manifolds to bleed off or reduce the pressure or gas in devices such as nitrogen gas springs often used in metal stamping, punching and piercing operations to yieldably hold a workpiece clamping ring of a die assembly. Such a gas spring may have an actuating rod connected to a piston slidably received in a cylinder having a chamber which may be charged to a predetermined desired pressure of nitrogen gas which may be in the range of 1,000 to 2,500 psi. When the rod and the piston are forced into the chamber gas therein is compressed to a maximum operating pressure which may be in the range of about 3,000 to 6,000 psi depending on the volume of the chamber, the effective area and stroke of the piston and the pressure to which the chamber was initially charged.

Manifolds may be connected to a source of pressurized gas and have a flow control valve which may be opened and closed to charge the chamber of a device such as a gas spring to a desired predetermined pressure. The manifold may also have a separate valve which may be opened and closed to relieve or bleed off some or all of the pressure of the gas in the chamber. Conventional pressure relief valve assemblies have complimentarily threaded parts which can become unintentionally loosened and result in an unintended relieving or bleeding off of pressurized gas in the chamber of a gas spring. This loss of pressure in the chamber of a gas spring may result in poor quality forming of workpieces and damage to the die assembly or other tooling with which the gas spring is used.

SUMMARY

A gas pressure relief valve assembly with threaded components which if they loosen do not open a normally closed pressure relief check valve. The valve assembly may have a main body with a normally closed pressure relief check valve received therein with a valve stem which may be depressed to open the check valve. An actuator pin may be generally coaxially aligned with the valve stem and slidably received in a guide body which may be threaded into the main body. A proximate end of the actuator pin may be advanced to engage and depress the valve stem to open the relief valve by manually rotating a knob which may be connected to the actuator pin adjacent its distal end and threaded onto the guide body so that rotation of the knob in one direction advances the knob on the guide body to advance the actuator pin to depress the valve stem and open the relief valve. Rotation of the knob in the opposite direction loosens or retracts the knob with respect to the guide body and moves the actuator pin away from the valve stem to permit the relief check valve to close. Any further intentional or unintentional rotation or loosening of the knob and/or loosening rotation of the guide body moves the proximate end of the actuator pin away from the valve stem and thus the pressure relief check valve remains closed and thus this loosening such as by vibration does not result in any relief of pressurized gas by the check valve.

This pressure relief valve assembly may have none, one or more of the significant practical advantages of loosening of the threaded knob and/or the actuator pin threaded guide body does not open the pressure relief valve, improved repeatability for opening or closing the pressure relief check valve, fine control of relieving or bleeding of pressurized gas, a relatively simple, rugged, durable and cost effective mechanism for gas pressure relief, and vibratory or other unintentional or intentional loosening of its threaded components does not open the pressure relief valve assembly.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figure 1:
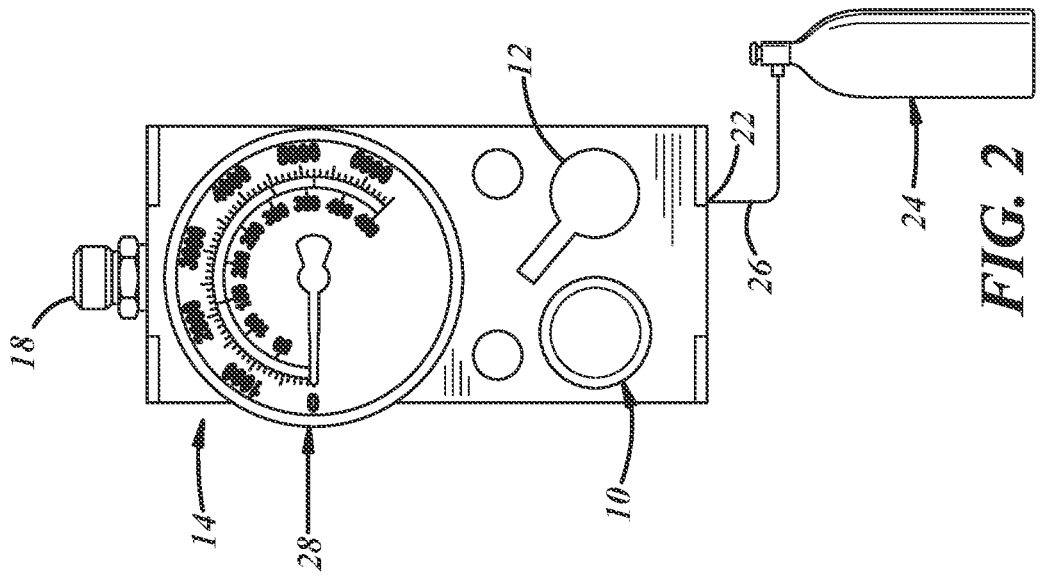
FIG. 1 is an isometric view of a control manifold with the pressure relief valve assembly received thereon and diagramatically showing a connection of the manifold to a gas spring.
Figure 2:
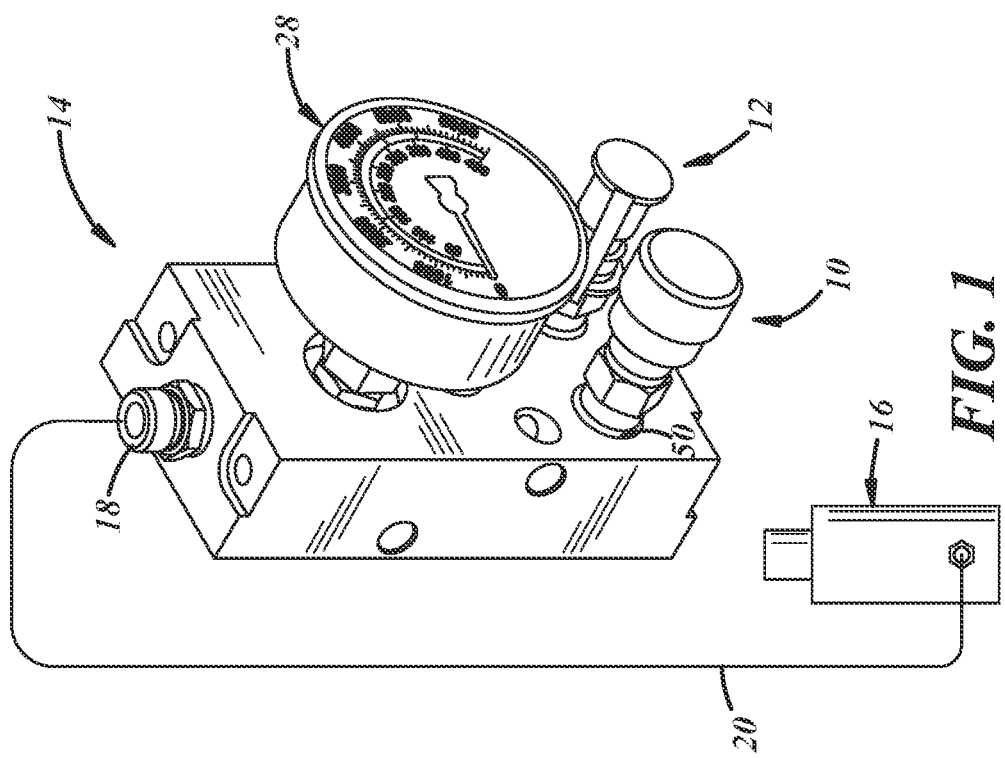
FIG. 2 is a front view of the control manifold of FIG. 1 diagramatically shows its connection to a container of compressed nitrogen gas.

FIGS. 1 and 2 illustrate an embodiment of a gas pressure relief valve assembly 10 and a charging valve 12 on a manifold 14 to control the charging with a pressurized gas such as nitrogen of a device such as a gas spring 16 and bleeding off or discharging pressurized gas from the device or gas spring 16. The gas spring 16 may be in fluid communication with a control port or coupling 18 of the manifold 14 through a high pressure conduit such as a flexible hose 20. The manifold 14 may have a gas inlet port 22 connected to a source of compressed gas at a high pressure such as a tank 22 containing nitrogen gas by a conduit such as a flexible hose 26.

For controlling the supply or charging of pressurized gas to a device such as the gas spring 16 from the tank 22 the manifold 14 may have the charging valve 12 communicating with passages in the manifold connecting the inlet 22 with the coupling 18. The charging valve 12 may be moved between a normally closed position (shown in FIG. 2) to an open position supplying compressed gas through the port 18 to a device such as the gas spring 16. To indicate the pressure of compressed gas in the gas spring, a gas pressure gauge 28 may be in fluid communication with the coupling 18 and thus with the gas spring 16. The normally closed pressure relief valve assembly 10 also communicates through passages in the manifold with coupling 18 to bleed off, discharge or reduce the pressure of compressed gas in the gas spring or other device when the relief valve assembly is manually actuated to its open position.

Figure 4:
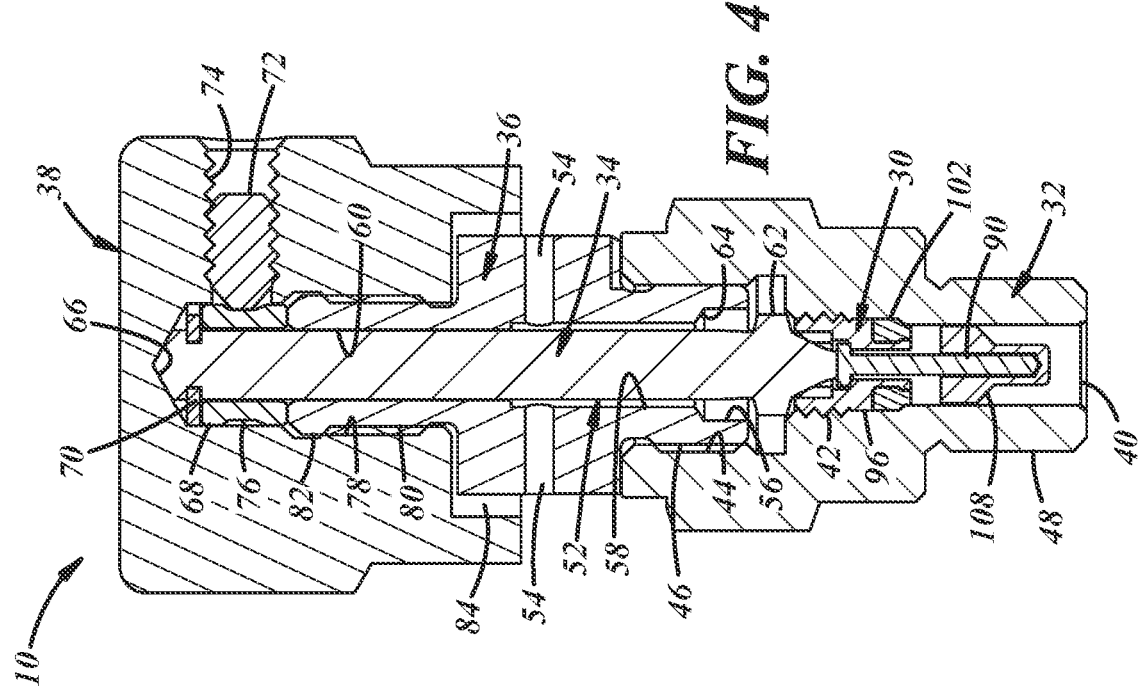
FIG. 4 is a sectional view of the relief valve assembly with its components shown in an open position.
Figure 3:
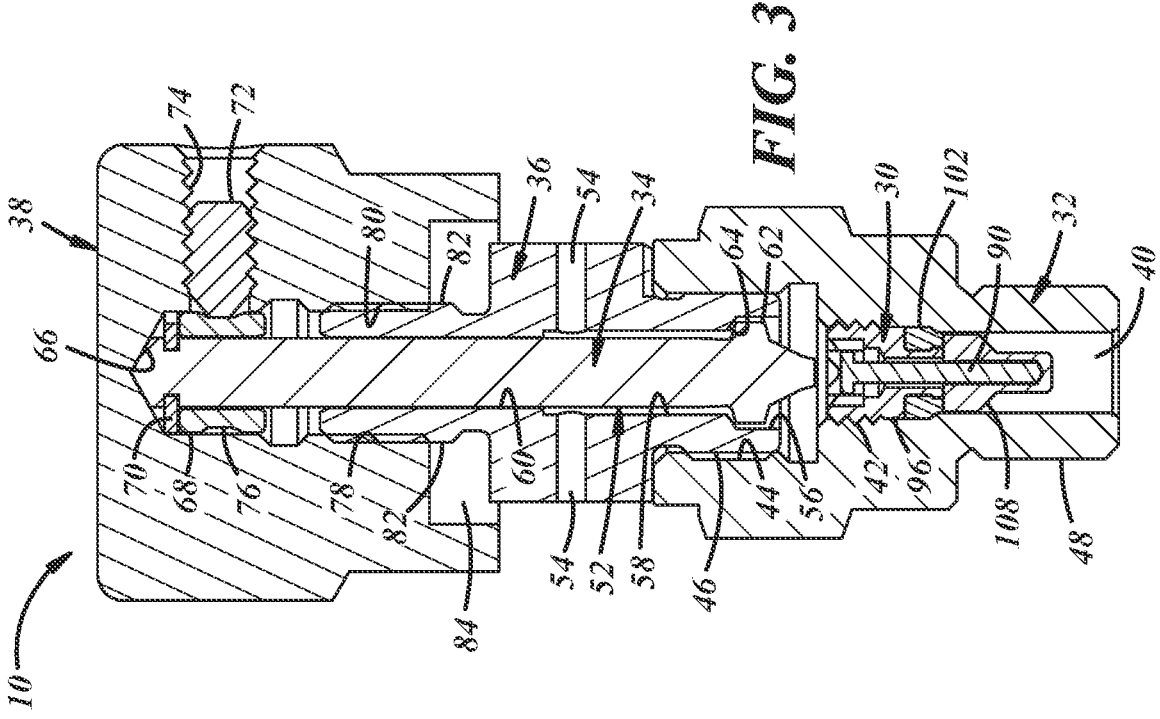
FIG. 3 is a sectional view taken on line A-A of FIG. 2 of the pressure relief valve assembly with its components shown in a closed position.

As shown in FIGS. 3 and 4 the valve assembly 10 has a normally closed discharge, pressure relief, bleed, or check valve 30 received in a main body 32 which may be opened and closed by axial movement of an actuator pin 34 slidably received in a guide body 36 and axially advanced and retracted by manual rotational movement of a knob 38. The main body 32 may have a throughbore 40 with a counterbore 42 in which the relief valve is threadably received, and a counter bore 44 in which the guide body 36 may be attached by complimentary threads 46. In use the main body may be attached by threads 48 to a complimentary threaded port 50 of the manifold so that the bore 40 upstream of the check valve 30 communicates with the port or coupling 18 of the manifold.

For discharging compressed gas to the exterior atmosphere when the check valve 30 is opened it communicates through an outlet passage 52 downstream of the check valve with passages 54 in the guide body 36 and opening to the exterior of the guide body. Passage 52 may be formed by counterbores 56 and 58 in the guide body each with a diameter larger than the adjacent portion of the actuator pin 34. Passages 54 may be bores through the guide body generally transverse to the axis of the actuator pin and intersecting the counterbore 58. Alternatively, passages 54 may be in the main body 32 or between the main and guide bodies. The actuator pin may be slidably received in a bore 60 through the guide body 36 with a slight clearance between them. In assembly, to prevent the actuator pin from being removed from the guide body it may have a flange 62 adjacent its inner end received in the counterbore 56 and engageable with a shoulder 64. Additionally, to maintain the extent to which the actuator pin 34 is advanced relative to the check valve 30, the flange 62 may also be a stop portion which is engageable with the main body 32.

Adjacent the other end, the actuator pin 34 may extend outwardly of the guide body into a blind bore 66 in the knob 38 and is attached to the knob for axial movement of the pin relative to the check valve 30 by the knob. The knob may be removably attached to the actuator pin by a collar 68 slidably received over the actuator pin and retained thereon by a snap ring 70 both slidably received in the coaxial blind bore 66 in the knob and with a set screw 72 threadably received in a complimentary threaded bore 74 in the knob and extending into an annular groove 76 in the collar. A threaded counterbore 78 in the knob engages complimentary threads 80 on a neck 82 of the guide body. The check valve 30 may be opened by rotating the knob 38 in one direction (clockwise for right hand threads 80) to advance the actuator pin 34 to open the check valve and rotated in the opposite direction to retract the actuator pin to permit the check valve 30 to close. Clearance between a bottom portion of the knob 38 and the guide body may be provided by a counterbore 84 opening into the bottom face of the knob.

Figure 7:
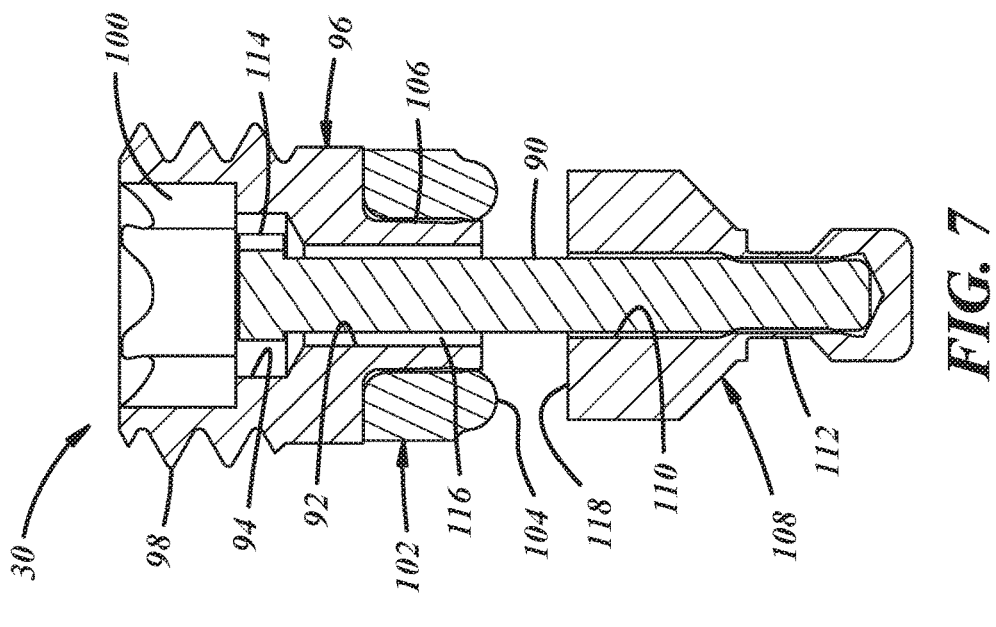
FIG. 7 is a sectional view showing the check valve in an open position.
Figure 6:
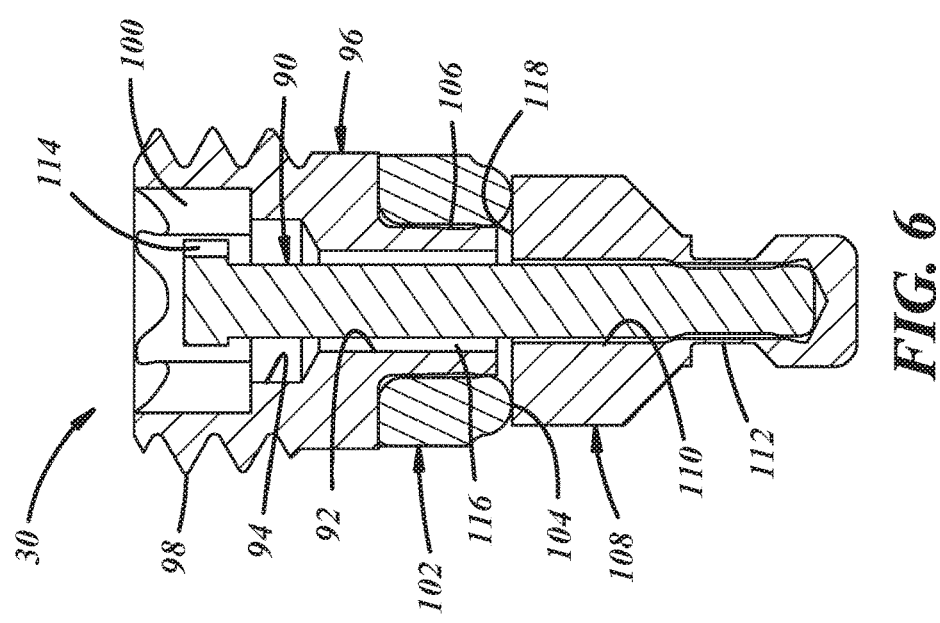
FIG. 6 is a sectional view taken on line B-B of FIG. 5 showing the check valve in its closed position.
Figure 5:
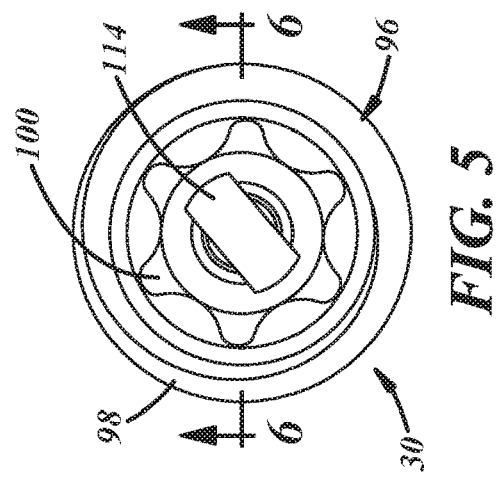
FIG. 5 is a top view of the check valve of the pressure relief valve assembly.

As shown in FIGS. 5-7 the check or bleed valve 30 may have a valve pin or stem 90 slidably received in a bore 92 and a counter bore 94 in a valve body 96 with clearance between them providing a recess 100 to permit compressed gas to flow through the valve body when the valve is open. The valve body may have exterior threads 98 for attaching and securing the check valve 30 in assembly in the main body 32 of the valve assembly 10 and a non-circular recess such as the star-shaped recess 100 for a tool used to install in and remove the check valve from the main body 32.

An annular seal 102 which also provides a valve seat 104 is received in an annular recess or shoulder 106 of the valve body and cooperates with a valve head 108 received on and attached to one end of the valve stem 90. The head may be permanently fixed or attached to the stem such as by a crimp to the pin in the area 112. Alternatively, the head and pin may be in one piece. To retain the valve stem in the body, at its other end it may have a head 114 larger than the bore 92 through the body and smaller than the inside diameter of the socket recess 100.

The axial distance between the bottom of the stem head 114 and the face 118 of the valve head 108 is sufficient so that when the stem head is depressed or advanced into the counterbore as shown in FIG. 7 the check valve may be fully opened so that compressed gas can pass between the valve head 108 and the seat 104 and flow out of the valve body 96 through the passage 116 provided by the clearance between them.

Alternatively, the check valve 30 may be a commercially available Schrader valve.

In use of the pressure relief valve assembly 10 its body 32 may be connected to the port 50 of a manifold 14 to place the inlet of the bore 40 in fluid communication with pressurized gas in a device such as the gas spring 16. With right hand threads 78 and 80, when the knob 38 is rotated counterclockwise sufficiently to axially move the actuator pin 34 so that it is disengaged from the head 114 of the check valve stem 90 the valve head 108 will be forced into sealing engagement with the seat 104 of the sealing ring 102 by the pressure of compressed gas in the inlet end of the bore 40 acting on the valve head. Thus, even if the knob 38 is unintentionally or intentionally further rotated counterclockwise to retract the actuator pin 34 and/or the guide body 36 is rotated or loosened to be retracted from the main body 32, the check valve 30 will remain closed and thus pressurized gas in the gas spring will not be bled off or discharged through the valve assembly 10. To bleed off or discharge gas from the gas spring the check valve 30 may be moved from its closed position (FIGS. 3 and 6) to its at least partially open position by manually rotating the knob 38 in the clockwise direction so that its threads 78 complimentary engaging the threads 80 of the neck 82 of the guide body move the actuator pin 34 into engagement with and depress or advance the valve stem 90 relative to the valve body 96 to disengage and move the valve head 110 away from the valve seat 104 to an at least partially open position (FIGS. 4 and 7). When the valve 30 is open, compressed gas may flow through the valve assembly 10 into the exterior atmosphere via the passage 116 between the valve stem 90 and body 96 of the valve 30, socket recess 100, passage 52, and passages 54 to the atmosphere exterior of the valve assembly 10. Alternatively, the knob and neck threads 78, 80 could be left hand threads, and then the knob 38 would be rotated clockwise to permit the check valve 30 to close and counterclockwise to open the check valve.

It should be appreciated that one of ordinary skill in the art will recognize other embodiments encompassed within the scope of this invention. The arrangements shown and described above are merely illustrative and not a complete or exhaustive list or representation. Of course, still other embodiments and implementations can be achieved in view of this disclosure. The embodiments described above are intended to be illustrative and not limiting the scope or spirit of the invention. The invention is defined by the claims that follow.

The invention claimed is:
1. A pressure relief valve assembly comprising:
a body with at least one flow passage in the body providing at least part of an opening to the exterior of the body, wherein the body comprises a main body and a guide body carried by the main body;

a normally closed check valve in the at least one flow passage in the body which when closed prevents the flow of compressed gas through the at least one passage and to the exterior of the body and when opened permits flow of gas through the at least one passage and to the exterior of the body;

an actuator pin slidably carried by the body and movable relative to the body to an advanced position opening the normally closed check valve and to a retracted position permitting the check valve to close; and a knob connected to the actuator pin and having threads engaged with complementary threads carried by the body and rotatable in one of a clockwise or counterclockwise direction to advance the actuator pin relative to the body to open the check valve and rotatable in the other of the clockwise or counterclockwise direction to retract the actuator pin relative to the body to permit the check valve to close;

wherein the body includes a shoulder engaged by at least a portion of the actuator pin to limit the extent to which the actuator pin is retracted relative to the body, wherein the actuator pin includes a flange adjacent an end of the pin adjacent the check valve, and the guide body includes the shoulder engaged by the flange to limit the extent to which the actuator pin is retracted relative to the guide body.

2. The assembly of claim 1 wherein the at least one passage includes an axial bore through the main body in which the check valve is received and the guide body includes a through bore in which the actuator pin is received at least in part for generally axial advancement or retraction relative to the check valve, and at least one counterbore in the guide body being larger in diameter than an adjacent portion of the actuator pin received therein to form at least part of the at least one passage through which compressed gas may flow when the check valve is at least partially open and at least one outlet passage in the guide body communicating with the at least one counterbore and an exterior portion of the guide body.

3. The assembly of claim 2, wherein the guide body is threadably connected to the main body.

4. The assembly of claim 3 which also comprises a collar slidably received on the actuator pin adjacent an end of the actuator pin distal from the check valve, a retainer engaging the actuator pin adjacent such distal end thereof and retaining the collar on the actuator pin, the collar being slidably received in a bore in the knob and the collar being retained in the bore in the knob.

5. The assembly of claim 2, wherein the actuator pin is guided by the bore of the guide body for generally axially movement by rotation of the knob.

6. The assembly of claim 2, wherein the normally closed check valve comprises a valve body, a bore through the valve body, a valve seat carried by the valve body and encircling the bore through the valve body, a valve stem received at least in part in the bore with a clearance between them, and a valve head connected to the valve stem and configured for engagement with the valve seat when the check valve is closed, and the valve stem is configured to be generally axially moveable relative to the valve seat to move the valve head to an at least partially opened position to permit compressed gas to flow between the valve head and the valve seat and through the clearance between the valve stem and the bore through the valve body.

7. The assembly of claim 1, wherein the normally closed check valve comprises a valve body, a bore through the valve body, a valve seat carried by the valve body and encircling the bore through the valve body, a valve stem received at least in part in the bore with a clearance between them, and a valve head connected to the valve stem and configured for engagement with the valve seat when the check valve is closed, and the valve stem is configured to be generally axially moveable relative to the valve seat to move the valve head between closed and an at least partially opened position of the check valve to permit compressed gas to flow between the valve head and the valve seat and through the clearance between the valve stem and the bore through the valve body.

8. The assembly of claim 1, wherein the normally closed check valve comprises a valve body, a bore through the valve body, a valve seat carried by the valve body and encircling the bore through the valve body, a valve stem received at least in part in the bore with a clearance between them, and a valve head connected to the valve stem and configured for engagement with the valve seat when the check valve is closed, and the valve stem is configured to be generally axially moveable relative to the valve seat to move the head to an at least partially opened position of the check valve to permit compressed gas to flow between the valve head and the valve seat and through the clearance between the valve stem and the bore through the valve body.

9. The assembly of claim 1, wherein the normally closed check valve comprises a valve body, a bore through the valve body, a valve seat carried by the valve body and encircling the bore through the valve body, a valve stem received at least in part in the bore with a clearance between them, and a valve head connected to the valve stem and configured for engagement with the valve seat when the check valve is closed, and the valve stem is configured to be generally axially moveable relative to the valve seat to move the valve head to an at least partially opened position of the check valve to permit compressed gas to flow between the valve head and the valve seat and through the clearance between the valve stem and the bore through the valve body.

10. The assembly of claim 1, which also comprises a collar slidably received on the actuator pin adjacent an end of the actuator pin distal from the check valve, a retainer engaging the actuator pin adjacent such distal end thereof and retaining the collar on the actuator pin, the collar being slidably received in a bore in the knob and the collar being retained in the bore in the knob.

11. A pressure relief valve assembly comprising:
a body with at least one flow passage in the body providing at least part of an opening to the exterior of the body;

a normally closed check valve in the at least one flow passage in the body which when closed prevents the flow of compressed gas through the at least one passage and to the exterior of the body and when opened permits flow of gas through the at least one passage and to the exterior of the body;

an actuator pin slidably carried by the body and movable relative to the body to an advanced position opening the normally closed check valve and to a retracted position permitting the check valve to close; and a knob connected to the actuator pin and having threads engaged with complementary threads carried by the body and rotatable in one of a clockwise or counterclockwise direction to advance the actuator pin relative to the body to open the check valve and rotatable in the other of the clockwise or counterclockwise direction to retract the actuator pin relative to the body to permit the check valve to close, wherein the actuator pin has a stop portion engageable with the body to limit the extent to which the actuator pin can be advanced relative to the check valve by rotation of the knob.

12. A pressure relief valve assembly comprising:
a body with at least one flow passage in the body providing at least part of an opening to the exterior of the body, wherein the body comprises a main body and a guide body carried by the main body;
a normally closed check valve in the at least one flow passage in the body which when closed prevents the flow of compressed gas through the at least one passage and to the exterior of the body and when opened permits flow of gas through the at least one passage and to the exterior of the body;
an actuator pin slidably carried by the body and movable relative to the body to an advanced position opening the normally closed check valve and to a retracted position permitting the check valve to close; and
a knob connected to the actuator pin and having threads engaged with complementary threads carried by the body and rotatable in one of a clockwise or counterclockwise direction to advance the actuator pin relative to the body to open the check valve and rotatable in the other of the clockwise or counterclockwise direction to retract the actuator pin relative to the body to permit the check valve to close;
a collar slidably received on the actuator pin adjacent an end of the actuator pin distal from the check valve, a retainer engaging the actuator pin adjacent such distal end thereof and retaining the collar on the actuator pin, the collar being slidably received in a bore in the knob and the collar being retained in the bore in the knob.

13. A pressure relief valve assembly comprising:
a body with at least one flow passage in the body providing at least part of an opening to the exterior of the body;
a normally closed check valve in the at least one flow passage in the body which when closed prevents the flow of compressed gas through the at least one passage and to the exterior of the body and when opened permits flow of gas through the at least one passage and to the exterior of the body;
an actuator pin slidably carried by the body and movable relative to the body to an advanced position opening the normally closed check valve and to a retracted position permitting the check valve to close;
a knob connected to the actuator pin and having threads engaged with complementary threads carried by the body and rotatable in one of a clockwise or counterclockwise direction to advance the actuator pin relative to the body to open the check valve and rotatable in the other of the clockwise or counterclockwise direction to retract the actuator pin relative to the body to permit the check valve to close; and
a gas spring with a gas pressure chamber and the at least one flow passage of the body is configured for communication with the pressure chamber of the gas spring upstream of the check valve in the at least one flow passage.

14. A relief valve assembly comprising:
a main body with a first bore and a coaxial first counterbore collectively extending axially through the main body;
a guide body with a second bore and a coaxial second counterbore collectively axially extending through the guide body and substantially coaxially with the first bore and counterbore of the main body, and the guide body carried by the main body;
a normally closed check valve in the first bore of the main body which when closed prohibits flow of compressed gas through the main body into the counterbore of the guide body and when open permits flow of compressed gas through the first bore of the main body and into the second counterbore of the guide body;
at least one outlet passage in the guide body communicating the counterbore of the guide body with the exterior of the guide body;
an actuator pin received at least in part in the second bore and counterbore of the guide body with a clearance between the actuator pin and the second counterbore of the guide body to permit the flow of compressed gas between the actuator pin and the second counterbore and through the at least one outlet passage when the check valve is at least partially open; and
a knob connected to the actuator pin and with threads engaging complementary threads on the guide body and configured so that rotation of the knob in one of a clockwise or counterclockwise direction advances the actuator pin to at least partially open the normally closed check valve and rotation of the knob in the other of the clockwise or counterclockwise direction retracts the actuator pin relative to the main body to permit the check valve to close,
wherein the knob has a stop portion engageable with the guide body to limit the extent to which the actuator pin may be advanced relative to the check valve by rotation of the knob or the actuator pin has a stop portion engageable with the main body to limit the extent to which the actuator pin can be advanced relative to the check valve by rotation of the knob, or both the knob and the actuator pin have stop portions engageable with the guide and main bodies respectively to limit the extent to which the actuator pin can be advanced relative to the check valve by rotation of the knob.

15. The assembly of claim 14, wherein the guide body also comprises a threaded portion extending into the first counterbore of the main body and engaging complementary threads in the first counterbore to connect the guide body with the main body.

16. The assembly of claim 14, wherein the actuator pin includes a flange adjacent an end of the pin adjacent the check valve, and the guide body includes a shoulder which may be engaged by the flange to limit the extent to which the actuator pin may be retracted relative to the guide body.

17. The assembly of claim 14 which also comprises a collar slidably received on the actuator pin adjacent an end of the actuator pin distal from the check valve, a retainer engaging the actuator pin adjacent such distal end thereof and retaining the collar on the actuator pin, the collar being slidably received in a bore in the knob and the collar being retained in the bore in the knob.

18. The assembly of claim 16, wherein the normally closed check valve comprises a valve body, a bore through the valve body, a valve seat carried by the valve body and encircling the bore through the valve body, a valve stem received at least in part in the bore with a clearance between them, and a valve head connected to the valve stem and configured for engagement with the valve seat when the check valve is closed, and the valve stem is configured to be generally axially moveable relative to the valve seat to move the valve head between closed and an at least partially opened position of the check valve to permit compressed gas to flow between the valve head and the valve seat and through the clearance between the valve stem and the bore through the valve body.

\* \* \* \* \*